T. FISHER.
PLATE LIFTER.
APPLICATION FILED SEPT. 14, 1917.
1,375,580.
Patented Apr. 19, 1921.
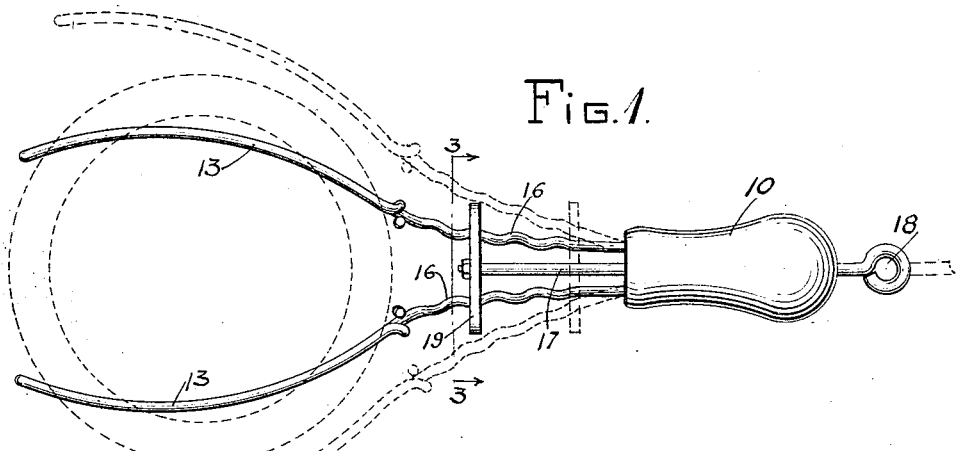
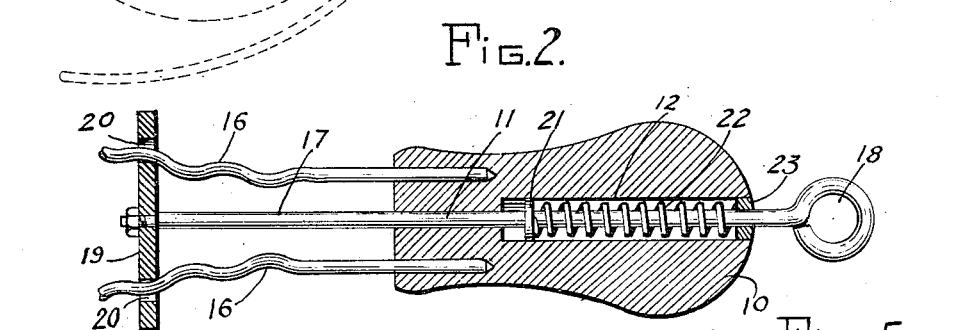
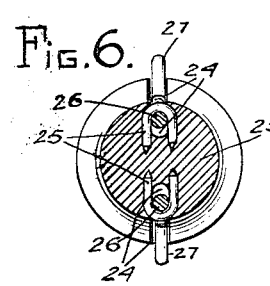
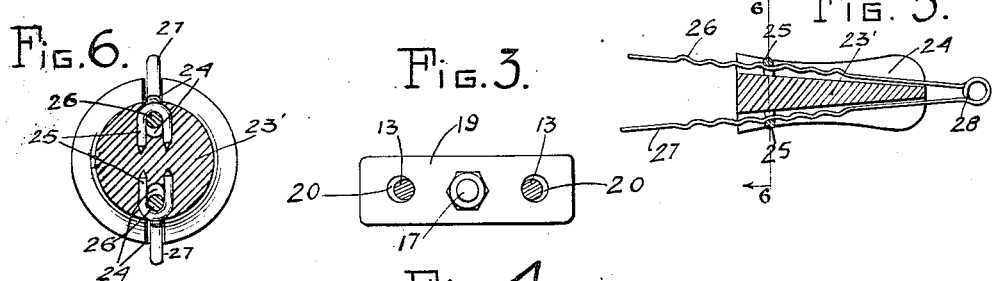
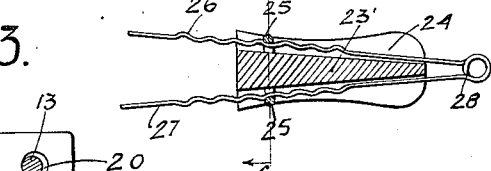
Inventor
THOMAS FISHER.
Witness
By Victor J. Evans
Attorney

UNITED STATES PATENT OFFICE.

THOMAS FISHER, OF KEARNEY, NEW JERSEY.

PLATE-LIFTER.

1,375,580.  Specification of Letters Patent.  Patented Apr. 19, 1921.

Application filed September 14, 1917. Serial No. 191,460.

*To all whom it may concern:*

Be it known that I, THOMAS FISHER, a citizen of United States of America, residing at Kearney, in the county of Hudson and State of New Jersey, have invented new and useful Improvements in Plate-Lifters, of which the following is a specification.

This invention relates to new and useful improvements in plate lifters and has particular reference to a device of this class for use in the lifting of hot plates or dishes. The primary object of the invention is the provision of an article of the class described which is provided with a handle having secured thereto, a pair of resilient arms for engagement with the periphery of the plate and means for adjusting the arms laterally with respect to each other whereby the user is not compelled to bring his hands into contact with the plate.

Another object of the invention is the provision of an article of this class which is provided with a means for normally projecting the arms toward each other and locking the same in such position whereby it is only necessary for the user to employ one hand in the handling of the dish, thus leaving the other free.

A further object of the invention is the provision of an article of this class which is of simple construction, thoroughly reliable and efficient for the purpose for which it is intended and inexpensive to produce.

With these and other objects in view, the invention resides in the novel construction, combination and arrangement of parts fully described in the following description, pointed out in the claims and illustrated in the accompanying drawings in which:—

Figure 1 is a plan view of the plate lifter illustrated showing a plate in dotted lines as secured therein.

Fig. 2, is a longitudinal sectional view therethrough.

Fig. 3 is a cross sectional view on the line 3—3 of Fig. 1.

Fig. 4 is a detail view of the plate engaging portion of the arm.

Fig. 5 is a detail sectional view of a modified form of the invention.

Fig. 6 is a cross sectional view on the line 6—6 of Fig. 5.

Referring to the drawings by numerals, 10 designates a handle which may be constructed from any desired material which is preferably a non-conductor of heat. The handle is provided with a longitudinal bore 11, which is enlarged at the outer portion as at 12, and is provided at its inner extremity with a pair of outwardly extending resilient plate engaging arms 13, which are doubled upon themselves as at 14, to provide a space 15, for engagement with the periphery of the plate. The arms are preferably crimped as at 16, for a purpose to be hereinafter described. Extending through the handle 10, is an operating rod 17, which is provided with a finger ring 18, at its outer extremity. The inner extremity of the arm 17, is secured to a slide 19, which is provided with spaced openings 20, which are adapted to receive the crimped portions 16, of the arms 13. The rod 17, is provided with an enlarged portion 21, and a coiled expansion spring 22, which is adapted to surround the outer portion of the rod and exert a pressure between the enlarged portion 21, and the removable head 23, of the handle in order to normally force the slide away from the handle. It will be further understood that the crimped portion 16, co-acts with the openings 20, in the slide to lock the slide against movement, thus preventing accidental derangement of the plate from its position and hence requiring the user to employ but one hand in carrying the plate within the holder.

In the modified form shown in Figs. 5 and 6 the handle 23', is provided with a pair of inclined slots or grooves 24, and in which are driven the staples 25, which co-act with the crimped portions 26, of the plate-engaging arms 27, the latter being constructed of one piece of material which is provided with the eye 28, on its connected portion, the handle being designed to be moved in the length of the arms for adjusting the same toward and away from each other. The crimped portions 26 co-act with the staples 25, to lock the handle against accidental movement on the arms.

While I have shown and described a simple and preferred form of my invention, I desire to reserve the right to make such changes and alterations as fall within the scope of the appended claims.

What is claimed is:

1. A plate lifter comprising a single length of resilient material bent upon itself to provide a pair of gripping arms, crimped portions adjacent the connected extremities of said arms, and a slide for effecting the relative adjustment of the arms and also constituting a handle, said slide being provided with longitudinally arranged slotted portions forming guides for the reception of the arms and transversely disposed devices arranged in said slot portions for retaining the arms therein, said devices also being adapted to co-act with the crimped portions of the arms for maintaining the adjustment of the same.

2. In a device of the class described, the combination of a single length of resilient material bent so as to form a pair of arms and a manipulative element and provided with a plurality of crimped portions, of a member comprising slots coöperative with said arms and movable relatively to said manipulative element, and means for retaining said arms in said slots and coöperative with said crimped portions to prevent relative movement of said manipulative element and said member.

In testimony whereof I affix my signature.

THOMAS FISHER.